(12) United States Patent
Heatley et al.

(10) Patent No.: US 8,276,883 B2
(45) Date of Patent: Oct. 2, 2012

(54) CABLE INSTALLATION

(75) Inventors: David J T Heatley, Felixstowe (GB);
Adrian R Thurlow, Stowmarket (GB);
Ian Neild, Ipswich (GB)

(73) Assignee: British Telecommunications public limited company, London (GB)

( * ) Notice: Subject to any disclaimer, the term of this patent is extended or adjusted under 35 U.S.C. 154(b) by 925 days.

(21) Appl. No.: 12/281,830

(22) PCT Filed: Feb. 12, 2007

(86) PCT No.: PCT/GB2007/000487
§ 371 (c)(1),
(2), (4) Date: Sep. 5, 2008

(87) PCT Pub. No.: WO2007/104913
PCT Pub. Date: Sep. 20, 2007

(65) Prior Publication Data
US 2009/0065547 A1 Mar. 12, 2009

(30) Foreign Application Priority Data
Mar. 10, 2006 (EP) .................................. 06251285

(51) Int. Cl.
*H02G 1/08* (2006.01)
(52) U.S. Cl. .............................. 254/134.3 R; 254/134.4

(58) Field of Classification Search ........... 254/134.3 R, 254/134.4, 134.3 FT, 134 R
See application file for complete search history.

(56) References Cited

U.S. PATENT DOCUMENTS

| 3,680,378 | A | * | 8/1972 | Aurilio et al. | 73/861.77 |
| 3,814,935 | A | | 6/1974 | Kissel | |
| 5,248,128 | A | * | 9/1993 | Warren et al. | 254/134.4 |
| 7,562,861 | B2 | * | 7/2009 | Fee et al. | 254/134.4 |
| 2010/0148138 | A1 | * | 6/2010 | Baker et al. | 254/134.3 R |
| 2011/0006786 | A1 | * | 1/2011 | Heatley et al. | 324/656 |

FOREIGN PATENT DOCUMENTS

| EP | 0 319 194 | 6/1989 |
| JP | 59-151041 | 8/1984 |
| JP | 2000-217216 | 8/2000 |

OTHER PUBLICATIONS

International Search Report for PCT/GB2007/000487, mailed Mar. 19, 2007.

* cited by examiner

*Primary Examiner* — Hadi Shakeri
(74) *Attorney, Agent, or Firm* — Nixon & Vanderhye P.C.

(57) ABSTRACT

A method, for use in connection with installing a cable into a conduit (4) having a first end and a second end (12), of detecting whether air is flowing from the first end to the second end, the method including the steps of: —providing a movement sensor (10) within or proximate to the conduit; —providing an air flow (14) into the conduit from the first end; and —detecting that the air is flowing to the second end when the air flow disrupt the movement sensor.

16 Claims, 3 Drawing Sheets

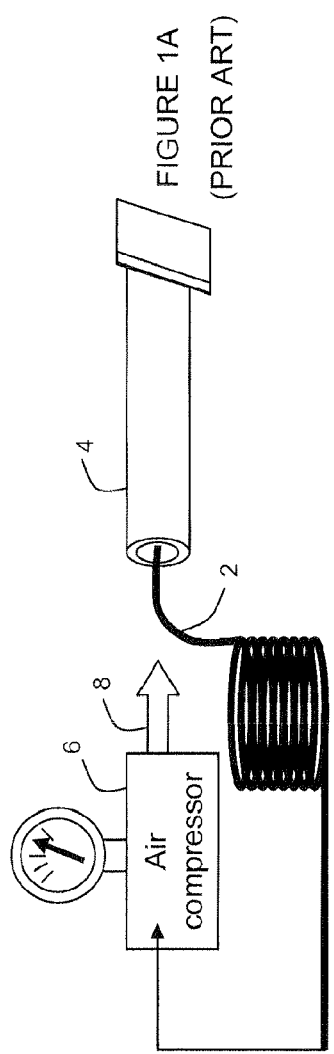
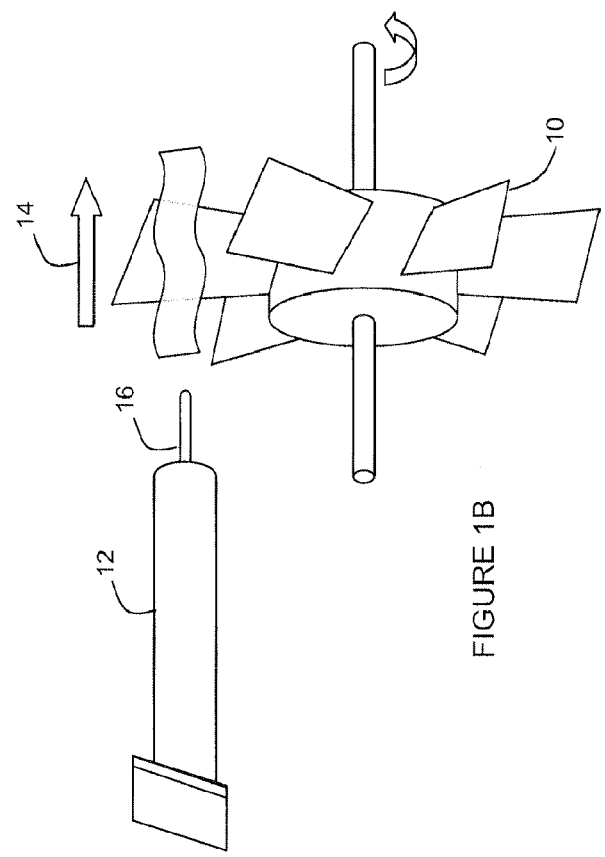

CABLE INSTALLATION

This application is the U.S. national phase of International Application No. PCT/GB2007/000487, filed 12 Feb. 2007, which designated the U.S. and claims priority to filed Europe Application No. 06251285.0, filed 10 Mar. 2006, the entire contents of each of which are hereby incorporated by reference.

BACKGROUND AND SUMMARY

The present invention relates to the installation of cables, such as optical fibre units, wires, electrical cables or the like. More specifically, but not exclusively, the present invention relates to the blowing of fibre unit cables through pre-laid conduits.

Optical fibres are widely used within telecommunication systems for high-speed information transfer. A fibre unit, which could comprise a single optical fibre, or a bundle of optical fibres, is commonly installed into a protective optical conduit comprising optical fibre tubes, which have already been laid along the desired route, usually as a continuous span between convenient access points such as surface boxes or inspection chambers.

The conduits typically are made of plastic, each with a typical inner diameter of 3 to 6 mm or more, and are usually provided in a bundle comprising up to 24 or more tubes, which are held together within a protective outer sheath. Each fibre conduit tube can receive at least one fibre unit comprising one or more individual optical fibres. Large numbers of conduits—and bundles of conduits—are pre-installed across the access network and the distribution network between the local exchanges and the customer premises in a branching network system. With the advent of fibre to the premises (FTTP), the conduits will further extend to and into commercial and residential premises. Indeed it is a fundamental part of the push to FTTP in e.g. the UK that substantially all the network comprises optical fibre, extending from the core network to as many end customers as possible. To achieve this, optical fibre installation needs to be speedy, cost- and effort-efficient.

In the vast majority of cases, a dedicated path is described between two points with a single length of conduit tube. In an exceptional case, the conduit path may comprise a number of lengths of physically separate conduit tubes which are connecterised together in series with tube connectors. Choosing the correct conduit tube at the installation should in the normal case, result in the fibre unit emerging at the other end.

Problems however may arise which result in the fibre unit not reaching the correct destination. During installation, the operator is usually presented with a large number of conduit tubes, which could result in a mistake in identifying the correct conduit, especially if the operator is working in adverse conditions down a manhole or in poor lighting. This may be so even where conduits are coloured coded which helps to direct the operator to the correct conduit.

There is also the possibility that a conduit route is wrongly mapped in the records used by the operator so that one end of the conduit does not lead to the correct destination. Where the path comprises a number of tube lengths connectorised together in series, yet another problem may lie in broken connections between lengths of conduit tubes within the network, so that the fibre unit may get lost within the system during installation and never emerge at the destination. Yet another issue may be the possibility that the fibre unit, during installation, could be impeded by an imperfect connector or a tight bend or some other source of friction in the conduit, and again never emerge at the destination.

For any of these or other reasons, the fibre unit will emerge in the wrong place, or not at all. Add to that some uncertainty about the exact length of the conduit route down which the fibre unit is being installed, so that the operator cannot even accurately know in a timely manner when something has gone wrong.

One method of installing fibre units into the conduits is by pulling them through the conduits. However, the tension induced can cause damage to the fibre units and impair their operating performance. A known alternative method is the "blown fibre" technique whereby a compressed fluid such as compressed air is used to convey, or "blow", a fibre unit along a conduit from one end.

Currently, installing fibre units using the blown fibre method requires at least two operators: one situated at the head end of the conduit, where during installation air and the fibre unit is installed into the mouth of the conduit, and one at the remote end of the conduit, where air and the fibre unit emerges from the mouth of the conduit. The second remote end operator is required because the remote end is often some distance away—up to a kilometer or more—from the head end. The operator at the head end is therefore unable to know the status of the remote end during an installation without a second operator located there.

The head end operator monitors and operates a fibre installation mechanism—known in the art as a "blowing head"—that feeds the optical fibre into the conduit and controls the supply of compressed air. He starts the process by directing air into the mouth of the head end conduit. If the air is directed into the correct conduit, the remote end operator will sense the arrival of the air with an air flow meter temporarily connected to the end of the conduit, or more simply by feeling the air flow exiting the conduit against his hand if the air flow is sufficiently high. He then communicates this to the head end operator by radio or other means, to confirm to the head end operator that he is applying air to the correct conduit. The head end operator then introduces the fibre unit into the conduit and blows it through to the remote end of the conduit, whereupon the remote end operator advises his colleague on its arrival. The head end operator then turns off the air supply and the blowing head, and the process is complete.

This process is labour-intensive as a minimum of two operators must work on a single installation. The head end operator needs to be skilled in the operation of the blowing head, while the remote end operator is required to alert his colleague to the status of the installation at the remote end.

Methods whereby a single operator at the head end of a conduit can detect the arrival of an optical fibre at the remote end of the conduit are known.

In the simplest method, the length of the conduit route is known, allowing the operator to know that the fibre has (probably) arrived at the remote end when the required length of fibre unit has been played out. This relies on the map record of conduit route being up to date and accurate, and presumes a completely smooth and obstruction-free conduit route. Neither of these can be guaranteed in practice.

Another known practice is to install at the remote end of the conduit a barrier of porous material such as an "airstone" which is placed at the remote end of the conduit, which will allow air through but which will stop further progress of the fibre unit. This cease in progress is detected by the blowing head which then stops further ingress. However even when the progress of the fibre has ceased, the operator at the head end cannot be certain that the fibre unit has reached the porous barrier at the end of the conduit, or if instead the fibre unit is caught on an obstruction at some point along the length of the conduit.

As described in WO9103756, a solution is to position a light source at the remote end of the conduit and a light detector is positioned at the head end. The arrival of the optical fibre at the remote end is indicated by the detection of light by the detector at the head end. One problem with this method is that an early, or "false", indication of the arrival of the optical fibre may occur if stray light is inadvertently introduced into the conduit at a location between the head end and remote end, e.g. at an open inspection chamber. This method also relies on adequate light being coupled into the advancing end of the optical fibre to be detected by the detector, however the coupling process is inefficient and is further degraded in proportion to the length of the optical fibre due to normal attenuation properties, so this method may not be practicable on long lengths of optical fibre. A second method described in this document uses a previously installed optical fibre to create part of a light "circuit" with the blown optical fibre. This method is not suitable for installing the first optical fibre in a conduit. Furthermore, any previously installed fibre units may be carrying live traffic and so would not be available to use for the installation of additional fibres.

Another known method is to use a blowing head such as that described in WO/9812588, which is configured to stop driving the fibre unit when it senses that fibre movement within the conduit is slowing down or stopping owing to an obstruction. When used in conjunction with a sealed-off remote end, the fibre unit would stop moving when it reaches the destination end. However, as the sealed-off end is just one type of obstruction the fibre unit may encounter on the conduit route, this method fails to positively identify when the fibre unit has reached and emerged from the conduit at the remote end without travelling to the remote end for a visual inspection.

Accordingly, in a general aspect, the present invention provides methods and devices for aspects relating to the installation of cables such as fibre units into conduit tubes, in particular, allowing a single operator to operate substantially on his own to determine if air fed into a conduit is reaching its intended destination, and/or if and when the fibre unit fed into the conduit has reached its destination. The invention can be used where the operator has to choose one of a number of conduits, or where there is a single conduit but where it is desirable to unambiguously confirm that the air and fibre unit reaches the intended destination.

A first aspect of the invention provides a method, for use in connection with installing a cable into a conduit having a first end and a second end, of detecting whether air is flowing from the first end to the second end, the method including the steps of
  providing a movement sensor within or proximate to the conduit;
  providing an air flow into the conduit from the first end; and
  detecting that the air flow disrupts the movement sensor, whereby an operator may determine that air is flowing to the second end.

By using this method, the operator may determine if he has chosen the correct conduit tube to feed the air flow into, or if in spite of making the correct choice, the air is nonetheless not reaching the desired remote end. The movement sensor will be disrupted by the sensed air flow and in one embodiment the sensor comprises a rotating blade which rotational speed is increased when the air flow arrives. The movement sensor can be placed at any point along the tube which would provide an indication of air flowing to the remote end, although preferably the sensor will indicate that the air is flowing out from the remote end of the tube, so the sensor can be placed at the end of the tube. In a further embodiment of the invention, the fact that the air flow has been sensed at the remote end can be signalled back to the operator at the head end.

A second aspect of the invention provides a method, for use in connection with installing a cable into a conduit having a first end and a second end, of detecting whether the cable has arrived at the second end, the method including the steps of
  providing a movement sensor within or proximate to the conduit;
  driving the cable through the conduit from the first end towards the second end; and
  detecting that the cable disrupts the movement sensor, whereby an operator may determine that air is flowing to the second end.

By using this method, the operator can determine that the cable has arrived at the remote end of the conduit tube, when the advancing end of the cable disrupts the movement sensor. In one embodiment the sensor comprises a rotating blade which rotational speed is decreased when the air flow arrives. The movement sensor can be placed at any point along the tube which would provide an indication that the cable has arrived at the remote end, although preferably the sensor is placed at the end of the tube. In a further embodiment of the invention, the fact that the air flow has been sensed at the remote end can be signalled back to the operator at the head end, and the apparatus providing the air flow and/or the apparatus mechanically driving the fibre into the conduit can be automatically shut off.

The term "disrupt" is used in the present document to indicate that a device or sensor in some way has its movement or state changed. Thus it may be used to indicate either that a sensing device has increased its rotational speed (e.g. because of an increase in air flow) or has decreased its rotational speed (e.g. because a fibre has jammed the sensor).

A third aspect of the present invention provides a method for use in connection with installing a cable into a conduit having a first end and a second end, comprising the steps of
(i) detecting whether air is flowing from the first end to the second end using a method including the steps of:
  providing a movement sensor within or proximate to the conduit;
  providing an air flow into the conduit from the first end; and
  detecting that the air flow disrupts the movement sensor, whereby an operator may determine that air is flowing to the second end; and
(ii) detecting the arrival of the cable at the second end using a method including the steps of:
  providing a movement sensor within or proximate to the conduit;
  driving the cable through the conduit from the first end towards the second end; and
  detecting that the cable disrupts the movement sensor, whereby an operator may determine that air is flowing to the second end.

By using this method, the operator can initially determine that the correct conduit tube has been selected and/or otherwise that air being fed in at the head end, is reaching the remote end as desired. Upon confirming this, the operator knows that the cable fed into the identified tube can be blown to the same destination remote end as the air flow. Cable is then fed into the tube, and the operator can further know when the cable arrives at the remote end so that the apparatus providing air flow and/or the mechanical driving force can be shut off.

A fourth aspect of the present invention provides a device for use in connection with installing a cable into a conduit having a first end and a second end comprising a movement sensor configured to be disrupted by one or both of the air flow and arrival of the cable at the second end; and detecting means for detecting the disruption of the movement sensor.

This device can be installed at any point which would provide the operator with an indication that the air flow and/or the cable has arrived at the remote end of the tube. Preferably, the device is positioned at the remote end itself, and comprises a rotatable blade capable of being disrupted by an air flow and/or the advancing end of the cable. The device could further be configured to send a signal to the operator at the head end to indicate that the movement sensor has been disrupted, indicating either air flow or cable arrival. Means to detect the disruption of the movement sensor can be a light source and light receiver, which would detect that disruption of the movement sensor causes an intermittent light signal to be received by the light receiver, indicating air flow or cable arrival.

BRIEF DESCRIPTION OF THE DRAWINGS

Embodiments of the present invention will now be described by way of example only, in relation to the accompanying drawings, in which:

FIGS. 1A and 1B show the basic elements and operating principle of the present invention;

DETAILED DESCRIPTION OF PRESENT EXAMPLE EMBODIMENTS

Figure 2:
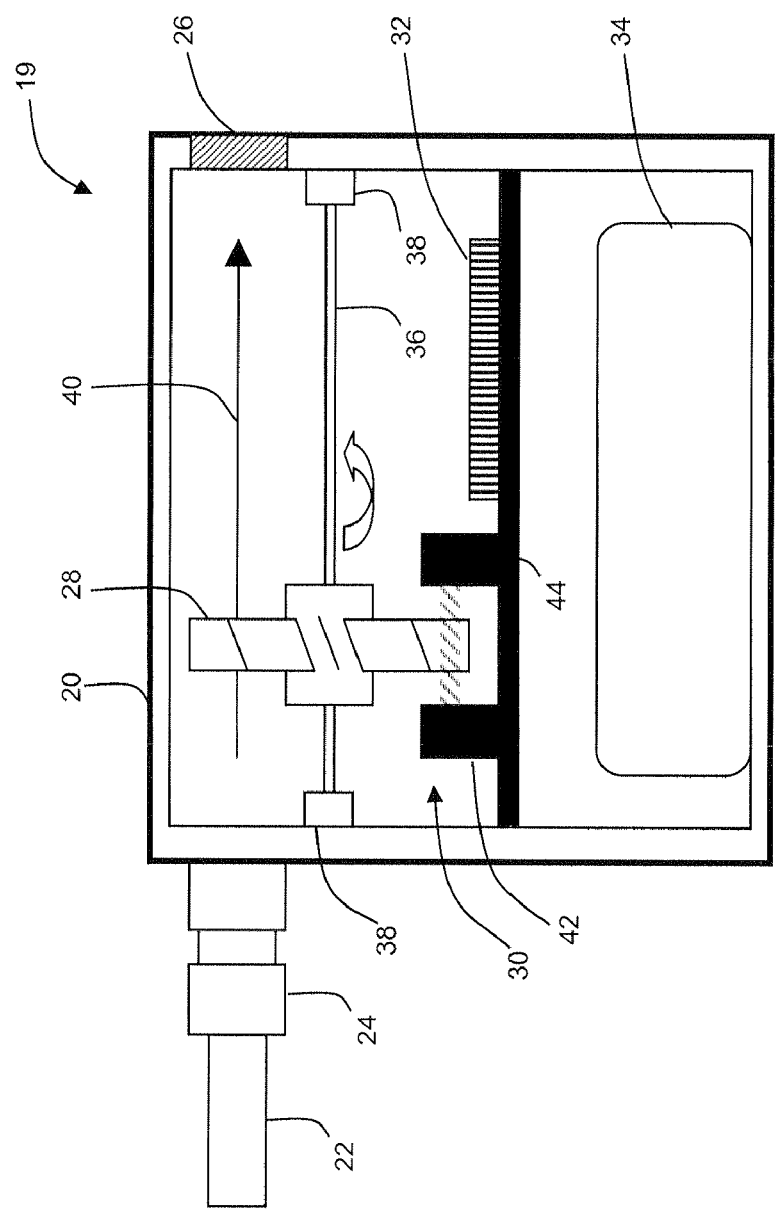
FIG. 2 shows a cross section of a device according to an embodiment of the present invention.

FIG. 1A shows the basic elements and operating principle of an embodiment of the present invention. A fibre unit 2 is inserted into the head end of a conduit 4 by an operator using a blowing head (for example, drive wheels which propel the fibre into and through the conduit). A compressor 6 is used to introduce a flow 8 of air into the head end of the conduit 4. In this way, the optical fibre 2 is conveyed through the conduit in part by the drive wheels, and in part by the action of viscous drag generated on the surface of the fibre unit, as is known in this field.

During an installation, the operator first determines that air introduced into the head end of the conduit does flow to the desired remote end, before introducing the optical fibre into the conduit. He turns on the compressor located at the head end, and if all is well (i.e. the operator has chosen the correct conduit, the conduit route is correctly mapped, etc.), the air flows in the direction of arrow 14 to the remote end of the conduit 12. The movement sensor 10 is coupled or otherwise positioned at the remote end of the conduit and arranged so that it can sense the movement of the air flowing. In the embodiment described here, the movement sensor is capable of rotation, and upon sensing the air flow, it is disrupted so that it changes its state or its rotational speed e.g. it either starts to rotate where it was previously not moving, or increases its rotational speed from a steady-state, or idle speed in the presence of air flowing from the remote end of the conduit 12. When the movement sensor 10 rotates, or increases its rotational speed, the single operator located away from the remote end can know (e.g. by being signalled via a radio channel using a radio frequency signal) that air is flowing through the particular conduit at which the sensor is located. In this way, a second operator located at the remote end of the conduit is not required.

The skilled person would recognise that the scope of the invention would include the configuration of movement sensor to sense and/or be disrupted by air flow movement, and to respond in ways other than by rotation. For example, elements disposed within the movement sensor for sensing purposes could be vibrated in the presence of air flow movements.

In FIG. 1B, the movement sensor 10 is shown as being positioned just beyond the mouth of the remote end of the conduit so that air flow passes over the blades of the movement sensor. Although this is the preferred position, the skilled person would be aware that it would be within the scope of the invention to position the movement sensor anywhere else proximate to the remote end of the conduit e.g. within the mouth of the conduit, or in a manner wherein a port is provided at a point along the conduit allowing the movement sensor to be coupled to the conduit. The closer the movement sensor is positioned to the mouth, the greater the certainty that the air flow will emerge from the correct remote end. If the movement sensor is placed other than at or within the mouth at the remote end, it would be preferable to remove it and shut any ports, to ensure that the air is then directed to flow to the mouth of the remote end where it is desired that the fibre unit after it has been determined that air is flowing to the correct remote end. This would ensure that the fibre unit following the air flow path will emerge from the mouth of the remote end, as desired.

In the present embodiment, it is possible that the movement sensor 10 may rotate under conditions where an air flow is not being deliberately introduced into the conduit for the purposes of a blown fibre installation, and so gives a false reading. For example, an atmospheric pressure difference between the remote end and head end of the conduit may generate a light air flow through the conduit, or weather conditions at either end of the conduit may be generally windy. In such cases, it may be preferable to detect that the rotational speed of the movement sensor 10 has increased to a speed above a pre-determined threshold, or to detect a change in speed of a given amount.

After the operator has determined that air is indeed flowing to the correct remote end 12, the optical fibre unit 2 is introduced into the head end of the conduit. It is driven along the conduit by a combination of drive wheels and the viscous drag of the air flowing along to the remote end. When the fibre unit arrives at the remote end of the conduit, the advancing end 16 of the fibre unit crosses the path of the rotating blades of the movement sensor 10 and disrupts their progress by changing its state or rotational speed e.g. by stopping rotation of the movement sensor is completely, or significantly slowing it down, when the fibre unit arrives at the remote end of the conduit. In this way, the operator can confirm (e.g. by being signalled via a radio channel using a radio frequency signal) that a fibre unit inserted at the head end of a conduit 4 has arrived at the remote end of that conduit 12.

This aspect of the invention to detect fibre arrival at the far end can be achieved by positioning the movement sensor just beyond the mouth or within the mouth of the conduit at the remote end. It can also be achieved with the movement sensor placed elsewhere but after arrival detection, the fibre unit will need to be redirected to emerge from the mouth of the remote end, as desired.

The invention can be used where the operator has to choose one of a number of conduits, or where there is a single conduit but where it is desirable to confirm that the fibre unit will reach the intended destination. In either case, a second operator is not necessary as the single operator at the head end can monitor the movement sensor to determine when the fibre has arrived, at which point the compressor and the blowing head can both be turned off. This can be done manually by the operator e.g. when he receives a signal confirming that the fibre unit has arrived at the remote end. Alternatively, turning off the blowing head and stopping the air flow can be automated, triggered by the detection of fibre arrival, to speed up the installation process.

An alternative way to confirm that air is flowing to the correct remote end and/or fibre arrival, is by monitoring the speed of rotation of the movement sensor 10, which changes over time in accordance with a characteristic acceleration or deceleration profile as the advancing end 16 of the fibre unit 2 approaches the remote end of the conduit 12. The change in rotational speed of the movement sensor over time may be compared with a characteristic acceleration or deceleration profile to detect the arrival, or impending arrival, of the fibre unit 2 at the remote end of the conduit 12.

The characteristic acceleration or deceleration profile is a specific and/or recognisable change in air flow over time that is consistent with the movement sensor sensing a change in the air flow caused by the fibre unit within the conduit as it advances and is nearing the end of the conduit. Thus, the flow of air towards and out of the remote end of the conduit can be determined. The arrival or impending arrival of the fibre unit at the remote end of the movement sensor can also be detected, advantageously without the need for any physical interaction between the movement sensor and the fibre unit itself. This could reduce the possibility of damage to the fibre unit or movement sensor arising from any such physical interaction.

A profile can be stored at e.g. at the processor 32 (please see below), below to permit comparisons of the measured air flow and any changes over time with the profile. When a match is obtained the operator can be signalled (e.g. via a radio channel using a radio frequency signal) that the air and/or fibre unit is nearing or at the end of the conduit.

FIG. 2 shows a section view of a device 19 according to an embodiment of the present invention that uses elements and operating principles described against FIGS. 1A and 1B. The device 19 may be used to confirm that the operator has chosen the correct conduit tube and that air is emerging from the remote end of that conduit, and/or for detecting when the fibre unit arrives at the remote end of the conduit.

The device is designed to be a portable unit which can be connected to the remote end of the conduit 22 via a connector 24. The housing 20 has an exhaust outlet 26 located opposite to the remote end of the conduit 22. The exhaust outlet 26 allows air flowing from the remote end of the conduit 22 to leave the housing 20. The exhaust outlet 26 may be in the form of, for example, an aperture in the wall of the housing 20, and may optionally be covered with a dust barrier such as a fine mesh grille. As a further example, the exhaust outlet 26 may comprise an additional connector for connection to a second conduit, in order to allow a fibre unit to pass through the device 19 and enter the second conduit.

The main components within the housing 20 are a movement sensor 28, a rotation detector 30, a processor 32, and a battery 34.

The movement sensor 28 comprises one or more number of blades mounted on a shaft 36 supported between bearings 38 which allow the movement sensor 28 to rotate about the longitudinal axis of the shaft 36. In particular, the movement sensor in this embodiment could be configured in the style of, for example, a known fan, turbine, anemometer or wind vane.

The movement sensor 28 is configured to rotate when air flows from the remote end of the conduit 22, as indicated by arrow 40. Preferably the movement sensor 28 has a low mass and low rotational inertia to rotate easily when air flows from the conduit. Additionally, a low mass may ensure that when a fibre unit crosses the path of the blade(s) of the movement sensor 28, the blades can quickly react to stop rotating to avoid or minimise damage to the fibre unit.

In this embodiment the rotation detector 30 comprises a light source 42 and a light detector 44 located so that light transmitted from the source 42 to the detector 44 crosses the path of the rotating blades of the movement sensor 28. The light source 42 may be any type of light source, such as an incandescent lamp. Preferably, the light source is a light emitting diode (LED) or a similar semiconductor device. The signal received by the light detector 44 will vary in frequency of detection and/or amplitude depending on the rotational speed and/or rotational position of the movement sensor 28. In particular, when the movement sensor 28 is rotating the light detector 44 will receive an intermittent signal from the light source 42, the intermittent signal being received at a frequency related to the rotational speed of the movement sensor 28. In this way, the rotational speed of the movement sensor may be measured. Alternatively, the detecting means may be a known mechanical or electromechanical device such as a tachometer mounted on the axle of the movement sensor.

The skilled person would realise that alternatives to the configurations of the movement sensor and rotation detector exist within the scope of the invention. For example, the blades of the movement sensor can be arranged to rotate in other directions. The rotation detector may alternatively be a mechanical, electrical or electromechanical device such as a tachometer mounted on the shaft. The processor 32 is configured to determine whether the signal received by the detector 44 indicates a change in the rotational speed of the movement sensor 28. Such a change may be positive or negative, and may be typically 10 to 100 rpm (revolutions per minute) or higher, depending on the design of the movement sensor 28 (e.g. the number of blades), the air flow and other factors.

Alternatively, the processor 32 may determine when the signal received by the detector 44 indicates that the movement sensor 28 is rotating above a first speed threshold or whether it is rotating at or below a second speed threshold. The first or second speed thresholds may be zero rpm or may be other rotational speeds typically in the range 10 to 100 rpm, although the design of the device 19 can implicitly accommodate speeds above or below this range. As a further alternative, the processor 32 may be programmed to recognise movement sensor acceleration or deceleration profiles corresponding to a characteristic acceleration or deceleration profile in a similar manner to that discussed above, and hence to indicate the arrival or impending arrival of the fibre unit at the remote end of the conduit.

Figure 3:
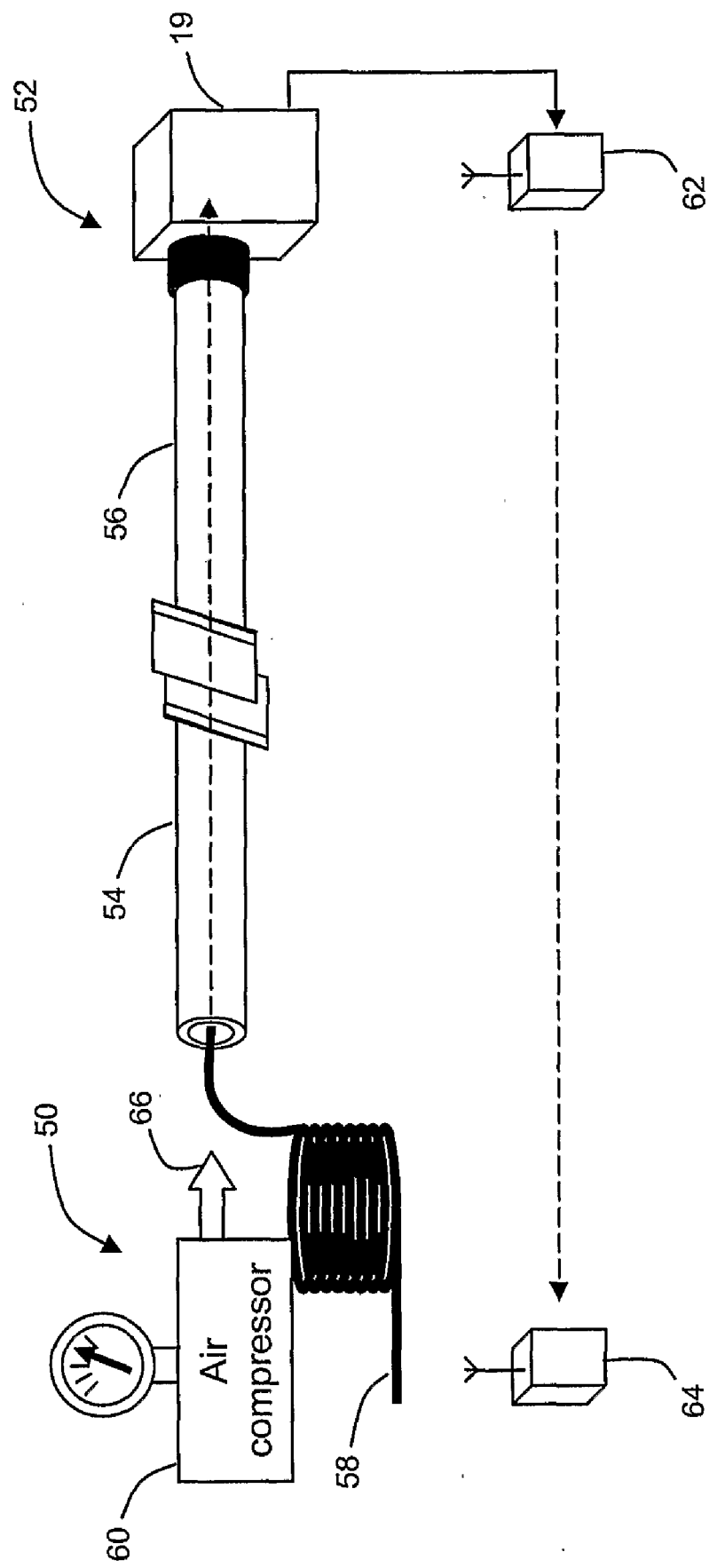
FIG. 3 is a schematic diagram showing a device according to an embodiment of the present invention in operation.

The processor 32 preferably is connected to a radio transmitter (62 in FIG. 3) which is configured to communicate with a radio receiver (64 in FIG. 3). The receiver can be portable, or can be a part of the blowing head; in any event it will, during the installation, be located with the operator at the head end of the conduit. The antenna of the radio transmitter may be contained within the housing or may be outside the housing but in communication with the processor 32 via a cable or other link.

In its simplest implementation the sensor will only send a signal to the operator at the head-end location when the status of its wind vane changes (e.g., it starts rotating from rest, or it stops after a period of rotating). This assumes that good radio connectivity is available from the remote end to the head end. A preferred approach might be for the transmitter to send a regular "ping" to the receiver to confirm the operational status of the radio link. This would be of particular significance in field situations where the sensor might be down a manhole or otherwise shrouded in dense material so that the radio signal is attenuated. Where wireless connectivity cannot be achieved using the transmitter's and receiver's internal antennas, the transmitter and receiver could be designed to accommodate an external antenna on a short cable, which would then allow the antenna to be located more optimally. The skilled person would realise that various alternative methods are available to obtain a connection between the transmitter and the receiver that are within the scope of the invention.

The battery 34 provides an energy source for the rotation detector 30, the processor 32 and the radio transmitter 62. Additionally, the battery 34 may provide an energy source for other components. The battery 34 may be any type of rechargeable battery or replaceable battery, but, will preferably be a dry-cell battery. The battery 34 may be located inside the housing 20 or outside the housing 20 and connected to it via a power cable. Alternatively, the device 19 may be provided with power from an external power source such as an A/C power supply (not shown).

The device 19 may incorporate further features such as a power (on/off) switch, power indicator light, and radio test switch for testing that communication is established between the radio transmitter and radio receiver. Furthermore, the communication link between the radio transmitter 62 and radio receiver 64 may be automatically periodically tested and, for example, a signal such as an audio or visual signal used to inform the operator when communication is/is not established.

The use of the above device in a method for confirming that air is emerging from the remote end of the conduit, before installing a fibre unit into that conduit, and/or for detecting that the fibre unit has arrived at the remote end of the conduit, will now be described with reference to FIG. 3.

An operator (not shown) initially installs the device 19 at the remote end location 52 by connecting the connector 24 to the remote end of the conduit 56, through which it is desired to install a fibre unit. In the embodiments where a signal is to be transmitted from the remote end to the head end of the conduit, the operator ensures that the device 19 is also connected to the radio transmitter 62 and that communication is established between the radio transmitter 62 and the radio receiver 64. In the simple "manual" case, the operator will first switch on the device 19 then press the radio test switch on the device to send a test signal (or ping) to the receiver. If the operator is carrying the receiver (e.g. on his belt) then he will detect that signal immediately. If the receiver is integrated into the blowing head at the head end, he will see that the test signal has activated an alert of some sort (e.g. via an LED) on the blowing head when he returns to the head end location. In either case if no test signal is received the operator will know that the radio link is poor and he cannot proceed with the installation until a good radio link is achieved.

This process can be automated. In such a case, the device 19 could have a conduit connector 24 which contains a microswitch of some form that activates when the connector is mated to the end of the conduit. That microswitch can be used to switch on the device 19 and also send the test signal. Consequently, when the connector is mated to the conduit, the device 19 is automatically switched on and the test signal transmitted. The operator will then check that he receives the test signal as described above.

The operator then moves to the head end location 50. In some embodiments the operator will again ensure that communication is established between the radio transmitter 62 and the radio receiver 64. In other embodiments this process is automated.

Where there are a number of conduit tubes, the operator chooses one conduit 54 from a selection of conduits. Where there is just a single conduit, the operator works with that one conduit. The operator uses a blowing head (not shown in full, but represented by drive wheels and air compressor 60) to direct a supply of air from a compressor 60 to introduce an air flow 66 into the conduit 54. If the air emerges from the remote end of the conduit, the movement sensor rotates and a signal is received at the radio receiver 64 indicating that the rotational speed of the movement sensor 28 within the device 19 has changed, either by a given amount, or by increasing to a speed above a first rotational speed threshold. The operator then concludes that the air from the compressor is causing the movement sensor 28 to rotate and thus that air is being blown into the correct conduit.

If no signal is received at the radio receiver 64 after a reasonable period, the operator may conclude that air is not being blown into the correct conduit. At that stage, if there is more than one conduit, the operator may select an alternative conduit and repeat the process for that conduit. The operator repeats this cycle until the correct conduit is identified. If the correct conduit has not been identified after all the available conduits have been tested, the operator may conclude that the desired conduit route is broken or obstructed, or that the map used by the operator which records the conduit route is erroneous and the desired conduit is actually going to a different unknown remote location. In either case the operator cannot proceed further with the installation at that location. The cost and effort of a futile installation session has however been avoided.

Once the operator has confirmed that air is flowing from the remote end of the correct conduit, he can then feed a fibre unit into the conduit 54 and blow it along the conduit until a signal is received at the radio receiver 64 indicating that the rotational speed of the movement sensor 28 within the device 19 has changed, either by a given amount, or by decreasing to a speed at or below a second rotational speed threshold. At this point, the operator may conclude that the advancing end of the optical fibre 58 has arrived at the remote end of the conduit 56 and has crossed the path of the blades of the movement sensor 28 so that its rotation is slowed and/or stopped. The operator ceases blowing in the fibre, by turning off the blowing head and stopping the supply of air from the compressor 60.

Alternatively, a signal may be received at the radio receiver 64 indicating that the detected speed of the movement sensor 28 has changed over time in accordance with a characteristic acceleration or deceleration profile, as described above. The operator may conclude that the advancing end of the optical fibre 58 has arrived at the remote end of the conduit, and can cease blowing in the optical fibre, by turning off the blowing head and stopping the supply of air from the compressor 60.

In further embodiments the above processes may be automated so that, for example, when a signal is received at the radio receiver 64 indicating that the air is flowing from the correct conduit the optical fibre 58 is automatically fed into the head end of the conduit 54 and/or when a signal is received at the radio receiver 64 indicating that the advancing end of the optical fibre 58 has arrived at the remote end of the conduit 56, the supply of air from the compressor 60 is automatically stopped. This can be achieved by e.g. transmitting a signal indicating fibre arrival to the compressor which could have its own receiver. In this way the time taken for an operator to react to a signal, form a conclusion and act upon it would be saved and the overall time taken for the complete installation process would be reduced.

Further modifications may also be made. For example, the rotational speed of the movement sensor 28 could be compared with a characteristic acceleration or deceleration profile in order to provide an early warning of the arrival of the optical fibre 58 at the remote end of the conduit. This information could be used to gradually reduce the speed of fibre unit travel within the conduit by reducing the speed of the drive wheels of the blowing head and/or by reducing compressor 60 pressure so that the speed at which the optical fibre 58 travels towards the remote end of the conduit 56 is gradually reduced as it approaches the remote end of the conduit, reducing the risk of damage of the advancing end of the optical fibre.

Additionally, it may be desirable to build a circuit into the device 19 to automatically switch the device off after the arrival of an optical fibre at the remote end of the conduit 56 has been detected. In this way, the working life of the battery 34 may be extended.

The methods, devices and configurations described above and in the drawings are for ease of description only and not meant to restrict the invention to any particular embodiments. It will be apparent to the skilled person that various sequences and permutations on the methods and devices described are possible within the scope of this invention as disclosed; similarly the invention could be used in various similar scenarios and for various cable types.

What is claimed is:

1. A device for use in connection with installing a cable into a conduit having a first end and a second end, the device comprising:
    a housing with an exhaust outlet covered by a dust barrier;
    a movement sensor configured to be disrupted by one or both of the air flow and arrival of the cable at the second end, the movement sensor being capable of rotation and of changing rotational speed in response to a disruption;
    a detector configured to detect the disruption of the movement sensor; and
    a transmitter for transmitting a radio frequency signal when a change in the rotational speed of the movement sensor is detected.

2. A device according to claim 1, wherein the device is suitable for location at or proximate to the second end.

3. A device according to claim 1, wherein the movement sensor is a low-inertia arrangement comprising a blade mounted on a rotatable axle.

4. A device according to claim 1, wherein the detector comprises a light source and a light receiver, and wherein rotation of the movement sensor causes the light receiver to receive an intermittent signal from the light source, so that the intermittent signal is received at a frequency related to the rotational speed of the movement sensor.

5. A method, for use in connection with installing a cable into a conduit having a first end and a second end, of detecting whether air is flowing from the first end to the second end, the method including
    providing a movement sensor within or proximate to the conduit;
    providing an air flow into the conduit from the first end;
    detecting that the air flow disrupts the movement sensor, whereby an operator may determine that air is flowing to the second end;
    driving the cable through the conduit from the first end towards the second end;
    detecting that the cable disrupts the movement sensor, whereby the operator may determine that air is flowing to the second end, the movement sensor being capable of rotation and wherein disruption of the movement sensor causes the movement sensor to change rotational speed; and
    detecting the arrival of the cable at the second end, including detecting when the rotational speed of the movement sensor falls to a speed equal to or below a deceleration rotational speed threshold.

6. A device according to claim 1, wherein: the movement sensor is configured to be disrupted by the air flow at the second end and by the arrival of the cable at the second end; and
    the detector is configured to detect the disruption of the movement sensor by the air flow at the second end and by the arrival of the cable at the second end.

7. The method according to claim 6, further comprising providing the air flow into the conduit to assist in installing the cable through the conduit.

8. The method according to claim 6, wherein the movement sensor is provided at or proximate to the second end.

9. The method according to claim 6, further comprising transmitting a signal when the arrival of the cable is detected.

10. The method according to claim 6, wherein the deceleration rotational speed threshold is zero.

11. The method according to claim 6, further comprising detecting the arrival of the cable at the second end, including detecting a change in the rotational speed of the movement sensor over time corresponding to an acceleration or deceleration profile.

12. The method according to claim 6, further comprising stopping the driving of the cable, when the arrival of the cable at the second end is detected.

13. The method according to claim 6, further comprising stopping the provision of the air flow when the arrival of the cable at the second end is detected.

14. The method according to claim 6, further comprising installing a cable into the conduit having the first end and the second end, and
    detecting whether air is flowing from the first end to the second end.

15. A method for use in connection with installing a cable into a conduit having a first end and a second end, the method comprising:
    providing a housing with an exhaust outlet covered by a dust barrier;
    providing a movement sensor configured to be disrupted by one or both of the air flow and arrival of the cable at the second end, the movement sensor being capable of rotation and of changing rotational speed in response to a disruption;
    providing a detector configured to detect the disruption of the movement sensor by one or both of the air flow and arrival of the cable at the second end; and
    transmitting a radio frequency signal when a change in rotational speed of the movement sensor is detected.

16. A device for use in connection with installing a cable into a conduit having a first end and a second end and for detecting whether air is flowing from the first end to the second end, the device comprising:
    a movement sensor arranged within or proximate to the conduit, air flow being provided into the conduit from the first end, the movement sensor being capable of rotation, the movement sensor configured to be disrupted by the air flow and/or the arrival of the cable at the second end, whereby an operator may determine that air is flowing to the second end, the cable being driven through the conduit from the first end towards the second end;
a detector arranged proximal the movement sensor and configured to detect disruption of the movement sensor, and
a processor configured to determine, via the detector, a change in the rotational speed of the movement sensor; wherein:
disruption of the movement sensor causes the movement sensor to change rotational speed; and
the arrival of the cable is detected at the second end, including detecting when the rotational speed of the movement sensor falls to a speed equal to or below a deceleration rotational speed threshold, via the processor.

* * * * *